E. L. ACKERMAN.
HINGE OR PIVOT CONSTRUCTION FOR WIND SHIELDS.
APPLICATION FILED AUG. 7, 1914.
1,243,794.
Patented Oct. 23, 1917.
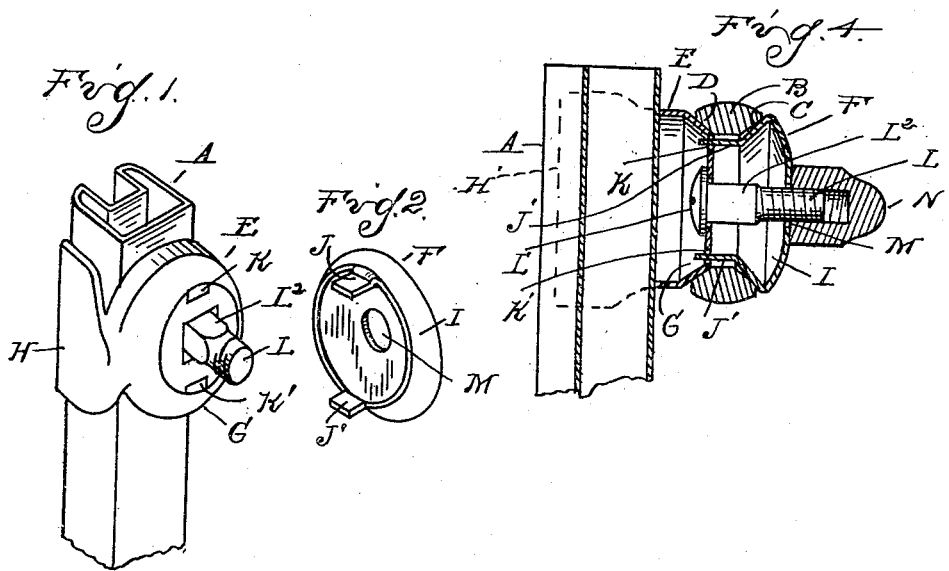
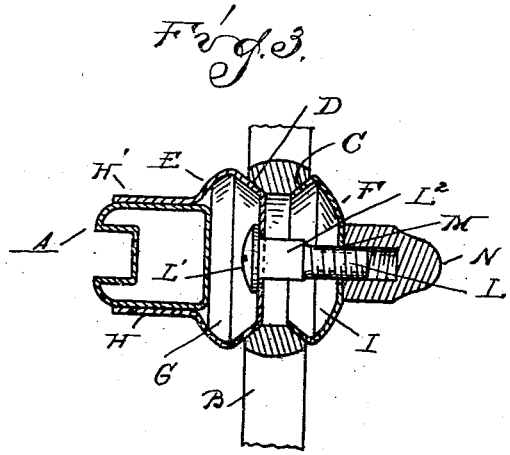
WITNESSES:
James P. Barry
Arthur D. Pulver
INVENTOR
Edward L. Ackerman
BY
ATTORNEYS.

UNITED STATES PATENT OFFICE.

EDWARD L. ACKERMAN, OF DETROIT, MICHIGAN, ASSIGNOR TO JOSEPH N. SMITH & COMPANY, OF DETROIT, MICHIGAN, A CORPORATION OF MICHIGAN.

HINGE OR PIVOT CONSTRUCTION FOR WIND-SHIELDS.

1,243,794.  Specification of Letters Patent.  Patented Oct. 23, 1917.

Application filed August 7, 1914. Serial No. 855,640.

*To all whom it may concern:*

Be it known that I, EDWARD L. ACKERMAN, a citizen of the United States of America, residing at Detroit, in the county of Wayne and State of Michigan, have invented certain new and useful Improvements in Hinges or Pivot Constructions for Wind-Shields, of which the following is a specification, reference being had therein to the accompanying drawings.

The invention relates to hinge or pivot construction for windshields and for similar constructions, and it is the object of the invention, first, to obtain a construction that may be formed by dies from flat sheet metal blanks; further, to provide a friction bearing which may be adjusted to hold the shield from accidental movement, while permitting of free adjustment when desired. With these objects in view the invention comprises the construction as hereinafter set forth.

In the drawings:

Figures 1 and 2 are perspective views of the coöperating formed sheet metal members;

Fig. 3 is a cross section in the plane of the pivot; and

Fig. 4 is a section in a plane at right angles to Fig. 3.

A is the windshield frame which may be a channel tube of any desired section, but shown as substantially rectangular; B is a portion of the frame or bracket, to which the shield is pivotally attached and which is apertured and provided with conical bearings C and D on opposite sides of the aperture; and E and F are members struck up from sheet metal, each being provided with a conical portion for fitting the conical bearings C and D respectively. The member E has a cupped portion providing the conical portion G and beyond the cup portion are flanges H and H' fashioned to embrace the tube A and secured thereto in any suitable way. The member F is also cupped, but has its flange bent inward to form the conical portion I provided with projecting lugs J and J' on opposite sides thereof for engaging apertures K and K' in the member E, so as to interlock therewith to prevent relative rotation. The member E is centrally apertured to receive a clamping bolt L having a head L' within the cupped portion of the member, and preferably a squared shank L² for engaging an aperture on the same frame so as to prevent rotation. The member F is centrally apertured at M for the passage of the bolt L, and a clamping nut N is adapted to engage the threaded end of this bolt outside of the member F to draw said member and the member E together upon opposite sides of the bracket B.

With the construction described, the main elements are formed from sheet metal by die operations, which greatly decreases the cost of manufacture by avoiding all machining. Furthermore, the work may be absolutely standardized, so that the parts will be interchangeable.

What I claim as my invention is:—

1. In a hinge or pivot center construction, a pair of cupped sheet metal members providing oppositely-inclined conical bearings, a central clamping bolt for connecting said members, and a lug projecting integrally from one of said members parallel to the pivotal axis and into interlocking engagement with the other member, for preventing relative rotation.

2. In a hinge or pivot center construction, the combination with an apertured member having conical annular bearings on opposite sides thereof, of a pair of cupped sheet metal members having conical faces for engaging the opposite sides of said apertured member, a central bolt having a head engaging the cup of one of said members, and a shank projecting through a central aperture in the other of said members, and a lug projecting from the conical flange of one of said members into engagement with a recess in the other member.

3. A hinge or pivot center construction comprising an apertured member having conical annular bearings on opposite sides thereof, a pair of cupped sheet metal members forming conical bearings for engaging the bearings in said apertured member, flanges on one of said sheet metal members for embracing the member to be attached thereto, a clamping bolt for centrally connecting said sheet metal members having a head engaging the recess in one of the cups, and a threaded shank projecting through an aperture in the other cup, a nut threaded for engagement with said shank, and a lug projecting from the conical flange of one of said members into engagement with a locking recess in the other member.

4. In a hinge or pivot center construction, the combination with an apertured member having bearings on opposite sides thereof, of a pair of cupped sheet metal members, one of said members having a flaring flange and the other a tapering flange for forming respectively conical bearings engaging the conical bearing in said apertured member and a lug on the tapering flange extending through the aperture in said apertured member and interlocking with the member having the flaring flange.

5. In a hinge or pivot center construction, the combination with an apertured member having conical bearings on opposite sides thereof, of a pair of coöperating cupped sheet metal members, one of said members being provided with a flaring flange and the other with a tapering flange forming conical bearings for respectively engaging the bearings on said apertured member, a bolt having a head engaging the recess in the cup of the flaring flanged member and passing through a central aperture in the tapering flanged member, a lug on said tapering flange passing through the aperture in said apertured member and interlocking with said flaring flange member, flanges on said flaring flanged member for embracing the member to be attached thereto, and a nut engaging said bolt and bearing against said tapering flanged member.

6. In a hinge or pivot center construction, comprising an apertured member having conical annular bearings on opposite sides thereof, a pair of cupped sheet metal members forming conical bearings for engaging the bearings in said apertured member, flanges on one of said sheet metal members for embracing the member to be attached thereto, a clamping bolt for connecting said sheet metal members having a head engaging the recess in one of the cups and a threaded shank projecting through an aperture in the other cup, a nut engaging said shank, and means locking said sheet metal members to prevent their relative rotation.

7. A hinge or pivot construction, comprising an apertured member having conical annular bearings on opposite sides thereof, a cupped sheet-metal clamping member forming a conical bearing for engaging one of the bearings in said apertured member, flanges upon said sheet-metal member for embracing the member to be attached thereto, a second clamping member having a conical portion for engaging the other bearing of the apertured member, a bolt having a head engaging the cup of said sheet-metal member, and having its shank passing through the aperture of said apertured member and passing through the second clamping member, and a nut threaded upon said shank and bearing upon said second clamping member.

In testimony whereof I affix my signature in presence of two witnesses.

EDWARD L. ACKERMAN.

Witnesses:
H. P. WILLIAMS,
C. E. BLAESSER.

Copies of this patent may be obtained for five cents each, by addressing the "Commissioner of Patents, Washington, D. C."